United States Patent
Jourdan et al.

(10) Patent No.: US 6,772,317 B2
(45) Date of Patent: Aug. 3, 2004

(54) METHOD AND APPARATUS FOR OPTIMIZING LOAD MEMORY ACCESSES

(75) Inventors: Stephan J. Jourdan, Portland, OR (US); Michael Bekerman, Campbell, CA (US); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 09/861,050

(22) Filed: May 17, 2001

(65) Prior Publication Data

US 2004/0015904 A1 Jan. 22, 2004

(51) Int. Cl.[7] ............................................. G06F 9/312
(52) U.S. Cl. ...................................................... 712/217
(58) Field of Search ......................................... 712/217

(56) References Cited

U.S. PATENT DOCUMENTS

| | | | | | |
|---|---|---|---|---|---|
| 4,992,938 A | * | 2/1991 | Cocke et al. | ............... | 712/217 |
| 5,430,866 A | * | 7/1995 | Lawrence et al. | ............ | 714/20 |
| 5,644,746 A | * | 7/1997 | Holt et al. | .................. | 712/217 |
| 5,694,574 A | * | 12/1997 | Abramson et al. | .......... | 711/140 |
| 5,721,855 A | * | 2/1998 | Hinton et al. | ................ | 712/218 |
| 5,881,262 A | * | 3/1999 | Abramson et al. | .......... | 712/216 |
| 6,061,777 A | * | 5/2000 | Cheong et al. | ............... | 712/23 |
| 6,266,763 B1 | * | 7/2001 | Witt et al. | .................... | 712/36 |
| 6,393,546 B1 | * | 5/2002 | Witt et al. | .................... | 712/36 |
| 6,463,523 B1 | * | 10/2002 | Kessler et al. | .............. | 712/216 |
| 6,505,293 B1 | * | 1/2003 | Jourdan et al. | ............. | 712/217 |
| 6,665,792 B1 | * | 12/2003 | Merchant et al. | ........... | 712/219 |

* cited by examiner

*Primary Examiner*—Eric Coleman
(74) *Attorney, Agent, or Firm*—Kenyon & Kenyon

(57) ABSTRACT

A computer architecture to process load instructions by allowing multiple mappings between logical registers and the same physical register is disclosed. The computer architecture includes a processor having a physical registers. The processor also includes a decoder to decode a load instruction that names a destination logical register. The processor also includes a register allocation table to map the destination logical register to a physical register within the plurality of physical registers. If the load instruction is predicted to collide with a prior load instruction that names a destination logical register, then the register allocation table maps the destination logical register to the physical register allocated to the first load instruction.

25 Claims, 3 Drawing Sheets

METHOD AND APPARATUS FOR OPTIMIZING LOAD MEMORY ACCESSES

FIELD OF THE INVENTION

The present invention relates to executing load instructions within a processor. More particularly, the present invention relates to a method and apparatus for optimizing load memory accesses using load reuse operations.

BACKGROUND OF THE INVENTION

Most instructions in a computer instruction set operate on several source operands to generate results. The instructions name, either explicitly or through an indirection, the source and destination locations where values are read from or written to. A name may be either a logical, or architectural, register or a location in memory.

Instructions involving register operands are faster than those involving memory operands. For some microprocessor architectures, instructions naming memory operands are translated, or decoded, into microinstructions that transfer operand values from memory to logical registers and then perform the decoded computations. The number of logical registers, however, often is limited, and, as a result, compilers should efficiently utilize logical registers to generate efficient code.

The number of physical registers available in a microprocessor typically exceeds the number of logical registers, so that register renaming may be utilized to increase performance. In particular, for out-of-order processors, register renaming allows instructions to be executed out of their original program order. Thus, for many out-of-order processors, an instruction is renamed so that logical registers named in the original instruction are renamed to physical registers.

Renaming a logical register involves mapping a logical register to a physical register. These mappings are stored in a Register Alias Table ("RAT"). A RAT maintains the latest mapping for each logical register. A RAT is indexed by logical registers, and provides mappings to corresponding physical registers. This activity may be called dependency tracking.

FIG. 1 depicts a register renaming and dependency tracking scheme involving three structures: RAT 110, active list 102, and free list 104. For each logical register specified by a renamed instruction, an unused physical register from free list 104 is allocated. RAT 110 is updated with this new allocation. Physical registers are free to be used again, or reclaimed, once they cannot be referenced by instructions in the current instruction window.

Based upon the data structures depicted in FIG. 1, one method for register reclaiming is to reclaim a physical register when the instruction that evicted it from RAT 110 retires. Thus, the instruction that created the new allocation to the physical register is retired. As a result, whenever a new allocation updates RAT 110, the evicted old allocation is pushed into active list 102. An active list 102 entry is associated with each instruction in the instruction window. When an instruction retires, the physical register of the old allocation recorded in active list 102, if any, is reclaimed and pushed into free list 104. The cycle is depicted in FIG. 1.

A scheme known as "result reuse" may be used to optimize the above-discussed process. Result reuse transforms the internal representation of the data-flow graph to significantly increase the level of instruction-level parallelism. Prior to renaming, whenever the result of an instruction is recognized to match the result of another instruction, the same physical register is used for both instructions. This scheme redirects all dependencies on both instructions towards the instruction that dynamically executes first. Result reuse relies on value-identity detectors. The detector outcome can be either safe or speculative. An example of a safe detector outcome is one directed to move instructions. Using value-identity detection, a move instruction can be completely eliminated from the execution stream. In such a case, it is safe to reallocate the physical register holding the source value because, by definition, the source and destination values are identical. An example of a speculative detector outcome is one directed to memory bypassing. Load instructions often collide with older store instructions in the instruction window of a processor. In such cases, the result of the load instruction is identical to the result that was stored in memory by the colliding store instruction. Predicting such value-identities for load instructions makes it possible to bypass memory accesses completely.

For any incoming instruction, the value-identity prediction structures may predict the location in the instruction window, or anywhere in the physical register space, of another instruction that produces the same result. In this case, the physical register allocated to this older instruction is retrieved from the instruction window, and reallocated for the incoming instruction.

The value identity predictor includes three parts. The first part establishes a potential identity relation between a pair of instructions. The second and third parts record and retrieve this value identity relation into/from the prediction structures. While general methods and structures exist for implementing the second and third parts, the first part typically is still done by an assortment of ad hoc methods for establishing the value identity.

Load instructions access memory locations to load data to the physical registers. The loaded data is, in turn, used in computations with the logical registers. The load instruction execution time is greater than accessing the physical registers. As a result, the number of load instructions may be significant in programs written for processor architectures. Therefore, it may be useful to provide for the efficient execution of load instructions with optimized register renaming and reclaiming schemes.

DETAILED DESCRIPTION

Figure 2:
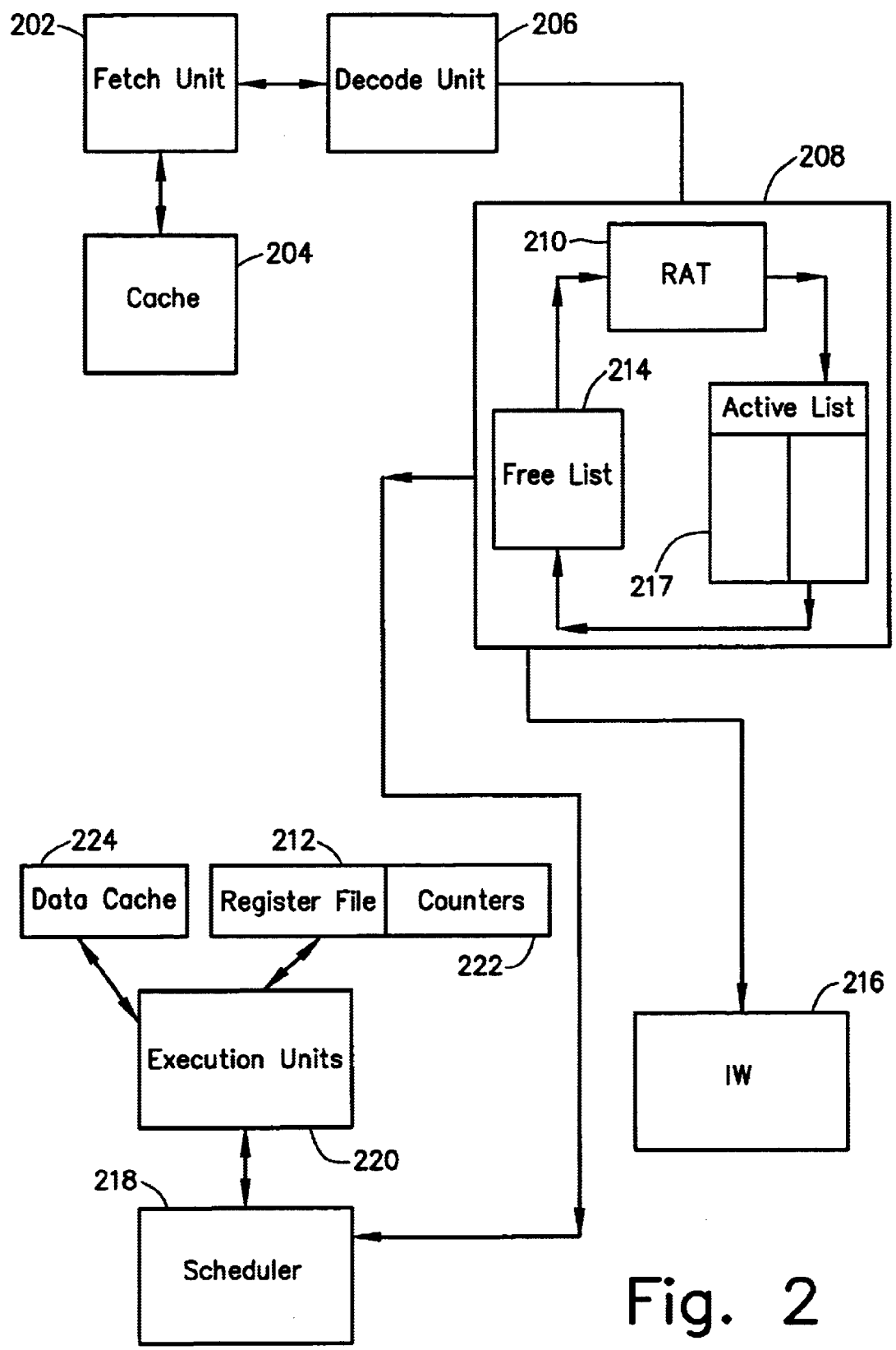
FIG. 2 is an out-of-order processor including a system for register allocation constructed according to an embodiment of the present invention.

Embodiments of the present invention may be described by referring to out-of-order processor 200, depicted in FIG. 2. Not all functional units of processor 200 are depicted in FIG. 2. Fetch unit 202 fetches instructions from instruction cache 204 and decode unit 206 decodes these instructions. For a Complex Instruction Set Computer ("CISC") architecture, decode unit 206 decodes a complex instruction into one or more micro-instructions. Usually, these micro-instructions define a load-store type architecture, so that micro-instructions involving memory operations may be practiced for other architectures, such as Reduced Instruction Set Computer ("RISC") or Very Large Instruction Word ("VLIW") architectures.

In a RISC architecture, instructions are not decoded into micro-instructions. Because the present invention may be practiced for RISC architectures as well as CISC architectures, no distinction is made between instructions and micro-instructions unless otherwise stated, and simply refer to these as instructions.

In FIG. 2, the register renaming functional unit is indicated by renamer unit 208, where Register Allocation Table ("RAT") 210 stores current mappings between logical registers and physical registers. The physical registers are indicated by register file 212, which is coupled to execution units 220, as described below. Every logical register has a mapping to a physical register in physical register file 212, where the mapping is stored in RAT 210 as an entry. An entry in RAT 210 is indexed by a logical register and contains a pointer to a physical register in physical register file 212. Some register in physical register file 212 may be dedicated for integers whereas others may be dedicated for floating point numbers, but for simplicity these distinctions are not indicated in FIG. 2.

During renaming of an instruction, current entries in the RAT provide the required mapping for renaming the source logical register(s) of the instruction, and a new mapping is created for the destination logical register of the instruction. This new mapping evicts the old mapping in the RAT 210 and RAT 210 is updated with the new mapping.

Table 1 depicts an example of register renaming. In Table 1, four instructions in original program order are provided in the first column. Renamed instructions are indicated in the second column. Next to each renamed instruction are the current entries in the RAT 210 after instruction renaming. The final column provides the mapping evicted by instruction renaming. For simplicity, only three logical registers, LRa, LRb, and LRc, are considered. A physical register is denoted by PRi where i is an integer. The first entry in Table 1 provides the current state of the RAT 210 before the first listed instruction is renamed.

For example, the first instruction LRa+2→LRa (indicating that the immediate 2 is added to the value of the logical register LRa and the result is stored in logical register Lra) is renamed to PR1+2→PR2, where physical register PR2 was assumed to be available. For this instruction, a new mapping LRa→PR2 was created and the old mapping LRa→PR1 was evicted from RAT 210. Note that there is a true dependence of the second and fourth instructions upon the first instruction, and a true dependence of the third instruction upon the second instruction. Register renaming, however, has removed the output dependency between the second and fourth instructions, as well as the anti-dependence between the third and fourth instructions, so that the second, third and fourth instructions may be executed out of order provided the execution order follows the various true dependencies.

TABLE 1

| Instruction | Renamed Instruction | RAT | Evicted Mapping |
|---|---|---|---|
| . . . | . . . | LRa → PR1<br>LRb → PR11<br>LRc → PR10 | . . . |
| LRa + 2 → LRa | PR1 + 2 → PR2 | LRa → PR2<br>LRb → PR11<br>LRc → PR10 | LRa → PR1 |
| LRa + 3 → LRb | PR2 + 3 → PR12 | LRa → PR2<br>LRb → PR12<br>LRa → PR10 | LRb → PR11 |
| LRb + 2 → LRc | PR12 + 2 → PR13 | LRa → PR2<br>LRb → PR12<br>LRc → PR13 | LRc → PR10 |

TABLE 1-continued

| Instruction | Renamed Instruction | RAT | Evicted Mapping |
|---|---|---|---|
| LRa + 5 → LRb | PR2 + 5 → PR14 | LRa → PR2<br>LRb → PR14<br>LRc → PR13 | LRb>PR12 |

Renamed instructions are placed in instruction window buffer 216. Entries in instruction window buffer 216 contain the opcode of the renamed instruction, as well as other fields to be described later. For this example, however, the results of instructions are not stored in buffer 216 but reside in physical register file 212. The ctive list 217 is one of the fields of the instruction window 216.

Instruction window buffer 216 allows for instruction retirement in original program order. By managing the active list 217, the instruction window buffer 216 is managed as well because of the correlation between the two. In this case the active list is a mapping to the active list field in the instruction window buffer 216. Buffer 216 is operated as a circular buffer, where a first pointer points to the next instruction to be retired and a second pointer points to the next available entry for a newly decoded instruction. Incrementing the pointers is done in modulo-N arithmetic, where N is the number of available entries in buffer 216. When an instruction retires, the first pointer is incremented. When a decoded instruction is placed in buffer 216, the second pointer is incremented. The pointers are incremented by one for each processed instruction.

Scheduler 218 schedules instructions to execution units 220 for execution. The scheduling function, for example, may be realized by reservation stations (not shown) implementing a known algorithm. Execution units 220 may retrieve data from or send data to data cache 224 or physical register file 212, depending upon the instruction to be executed (e.g., read or write operations).

In other embodiments of the present invention, the information content contained in the data structures of physical register field 212 and instruction window buffer may be realized by different functional units. For example, a re-order buffer may replace instruction window buffer 216 and physical register file 212, so that results are stored in the re-order buffer, and in addition, registers in a register file are dedicated as logical registers. For this type of embodiment, the result of an instruction specifying a write to a logical register is written to a logical register upon instruction retirement.

Load instructions move the value held in a memory location into a logical register. If it happens that two load instructions in the instruction window access the same memory location, and if there is no intervening store instruction (or snoop) for the same memory location, both load instructions produce the same result. A detection system, such as one known in the art, may be used to predict or ascertain two such load instructions in the code. The result reuse scheme can be applied to eliminate the second load. Performance may be increased because latency of the second load should not be incurred and the load memory traffic to memory is reduced. Embodiments of the present invention speculate on such events to perform result reuse for load instructions from memory.

Whenever it is determined or predicted that two loads access the same location with no store to this location in between, load reuse performs result reuse by re-allocating the physical register that has already been allocated to the first load to the second load. Multiple mappings indicates the action where more than one logical register may be mapped to the same physical register. Effectively, such load instructions are performed during the renaming stage. These instructions remain in instruction window buffer 216 ready to be retired. Dependency graphs are collapsed because instruction dependent on such load instructions are made dependent directly on the real producer, such that the dependencies are redirected. There also may be a reduction in the requirement for physical registers, and there may be fewer writes into the register file.

Embodiments of the present invention provide a mechanism for mapping more than one logical register to the same physical register, or a many-to-one mapping. These mappings may be facilitated by utilizing a set of counters 222, where a counter is provided for each physical register in physical register file 212. The value of a counter indicates whether its associated physical register is free. For simplicity of discussion, we may take a counter value of zero (0) to imply that there are no current mappings to the physical register and that it is free. Embodiments of the present invention, however, are not limited to using counter values of zero (0) to indicate that a physical register is free.

Each time a new mapping between a logical register and a physical register is created, the counter associated with that physical register is changed by a first increment. In some embodiments, the first increment is positive, so that the counter is incremented for each new mapping. When a mapping to a physical register is no longer needed, its counter is changed by a second increment, opposite in sign to the first increment.

A physical register becomes free again if there are no longer any mappings to it that are needed by in-flight instructions. A counter associated with a physical register is changed by the second increment, such as being decremented, each time an instruction that evicted a mapping to a physical register retires. When a counter reaches a pre-determined value, such as zero (0), then that physical register is free.

In some embodiments of the present invention, the active list 217 (which represents fields in instruction window buffer 216) has pointer fields for pointing to physical registers. When an instruction placed in instruction window buffer 216 has evicted a mapping in RAT 210, a pointer field associated with the instruction is set to point to the physical register of the evicted mapping. These pointer fields comprise an active list. A free list may be a queue of pointers pointing to free physical registers. As each instruction retires in instruction window buffer 216, the counter associated with the physical register recorded in the active list 217 for the retiring instruction is changed by the second increment, such as being decremented. When the counter reaches 0, then the physical register is moved to the free list 214.

Figure 1:
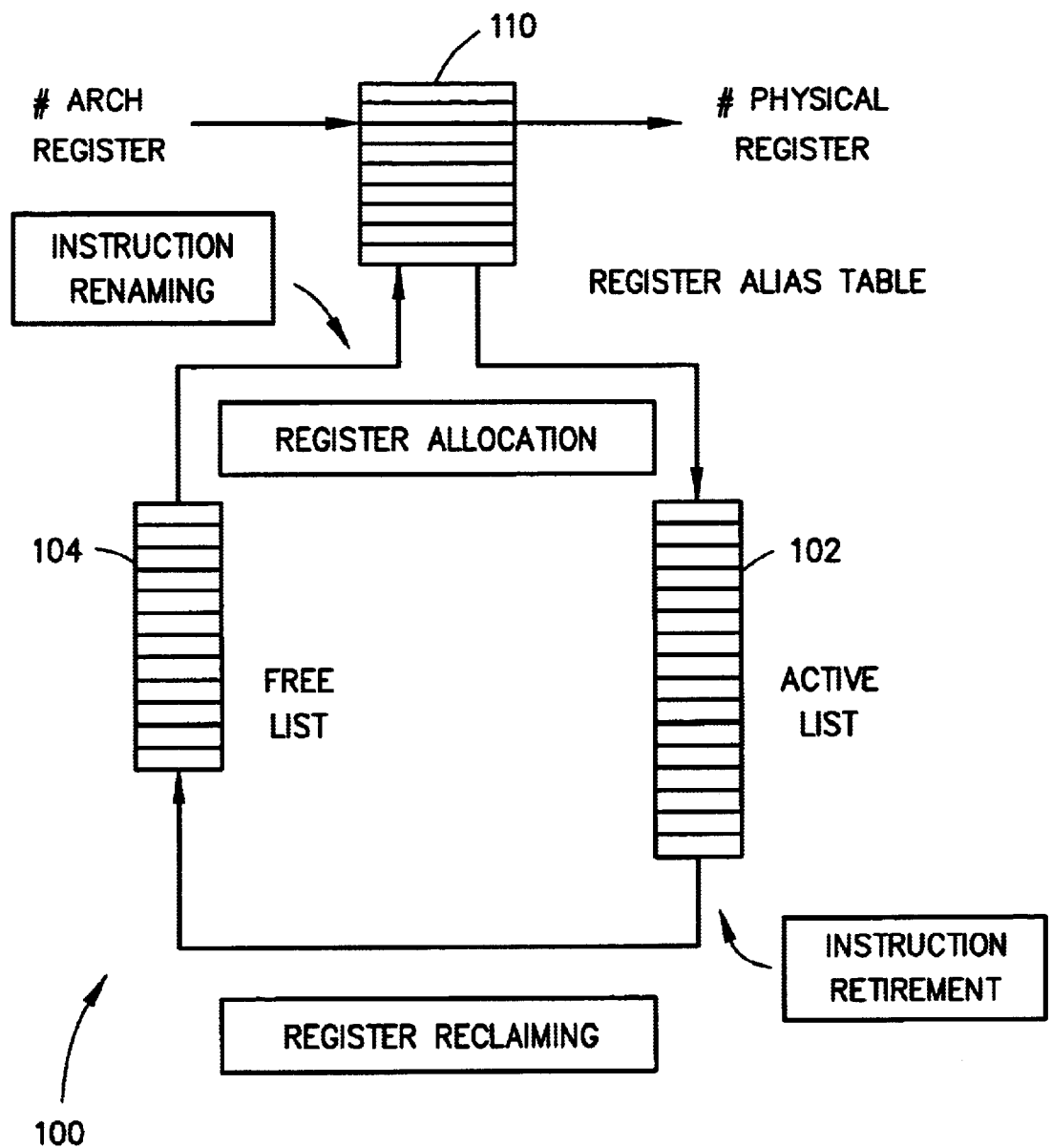
FIG. 1 is a system for register reallocation as know in the art.

In this way, the use of a set of counters 222 ensures that no physical register is lost during the cycle depicted in FIG. 1. The maximum number of concurrent mappings to a given physical register depends upon the number of bits allocated to its associated counter. Note that there may be more mappings than there are logical registers because the number of instructions in flight may be larger than the number of logical registers.

Table 2 provides an example of register re-use for load reuse instructions. In Table 2, two load instructions are provided that access the same memory location without an intervening store or snoop instruction. Table 2 is similar to Table 1, except that an additional column is added to indicate the current state of the physical register counters.

The first entry in Table 2 provides the current state of the RAT 210, and the physical register counters before the first displayed instruction is renamed. In this example, a counter value of zero (0) indicates that its associated physical register is free. Note that initially, physical registers PR2 and PR12 are free and available for new mappings because their counter values are zero (0).

Next to each renamed instruction is a pointer indicating the physical register named in the evicted mapping. For example, when the first displayed instruction is placed in the instruction window buffer 216, the pointer field associated with its entry is set to point to physical register PR1 because the renamed instruction evicted the mapping LRa→PR1. Furthermore, because physical register PR2 now has been allocated in the new mapping LRa→PR2, its counter is incremented by one (1). As seen in Table 2, the first displayed instruction loads the value stored at memory address A into logical register LRa. The second displayed instruction loads the same value stored at memory address A into logical register LRb. The third displayed instruction adds the immediate value 2 to the value stored in LRb and stores it in Logical Register LRc. In accordance with an embodiment of the present invention, the second displayed instruction reuses physical register PR2 so that its destination logical register is mapped to the same physical register mapped by the destination logical register in the first displayed instruction. Execution of the load instruction is performed by the renaming, but the entry in the instruction window buffer 216 is still provided so that the pointer field associated with its entry is set to point to physical register PR2. Note that the counter for physical register PR2 is incremented from one (1) to two (2) as its value was set to one (1) in the previous instruction. The third instruction instead of being dependent on the second instruction is made dependent on the first instruction. As described previously, for some embodiments of the present invention, when an instruction retires, the counter pointed to by its associated pointer is decremented. As a simple example, suppose in Table 2, the instruction window has only the three instructions displayed, and the third displayed instruction is retired. Because the third renamed instruction has a pointer to physical register PR12, the counter for physical register PR12 is decremented from one (1) to zero (0) upon retirement of this instruction, and physical register PR12 is free to be used again.

TABLE 2

| Instruction | Renamed Instruction with pointer | RAT | Evicted Mapping | Counters after Renaming |
|---|---|---|---|---|
| . . . | . . . | Lra → PR1<br>LRb → PR11<br>LRc → PR10 | . . . | $C_1 = 1\ C_{11} = 1$<br>$C_2 = 0\ C_{12} = 0$<br>$C_{10} = 2$ |
| [A] →<br>Lra | [A] →<br>PR2;1 | Lra → PR2<br>LRb → PR11<br>LRc → PR10 | LRa → PR1 | $C_1 = 1\ C_{11} = 1$<br>$C_2 = 1\ C_{12} = 0$<br>$C_{10} = 2$ |
| [A] →<br>LRb | [A] →<br>PR2;11 | Lra → PR2<br>LRb → PR2<br>LRc → PR10 | LRb →<br>PR11 | $C_1 = 1\ C_{11} = 1$<br>$C_2 = 2\ C_{12} = 0$<br>$C_{10} = 2$ |
| LRb +<br>2 → LRc | PR2 + 2 →<br>PR12;10 | Lra → PR2<br>LRb → PR2<br>LRc → PR12 | LRc →<br>PR10 | $C_1 = 1\ C_{11} = 1$<br>$C_2 = 2\ C_{12} = 1$<br>$C_{10} = 2$ |

Embodiments of the present invention include a detection mechanism to determine whether two loads access the same location with no store to this location between the two load instructions. A detector may be a value identity detector to determine, or predict, whether two load instructions access the same location. For a given load instruction, embodiments of the present invention may detect, either speculatively or not, before renaming the location in the instruction window of another load that accesses the same memory location. There are various detection mechanisms known in the art that can be modified in accordance with embodiments of the present invention to achieve this result.

In one embodiment of a detection system, a distance value may be associated with a second load instruction. This distance value, which is negative in this embodiment, would indicate a number of instructions from the first load instruction to the second load instruction that is from the same memory location. As stated above, the register renaming feature of the present invention may be used when there is no intervening store or snoop instructions between two load instructions from the same memory address. Also, the distance value may indicate where a potential (e.g., predicted) first load instruction meeting this instruction can be found.

In the case of a prediction, it is desirable to verify the accuracy of the prediction. To this end, the second load instruction is executed in due course even though its dependent instructions may have been executed already. Upon execution of the second load instruction, the processing logic verifies that the result of the instruction was, in fact, the same as the result of the instruction identified by the prediction. If the verification is successful, no further action need be taken. If the verification indicates that the prediction was wrong, the register renaming should be changed so that a different physical location is assigned. Moreover, all of the instructions dependent on the load will have to be re-executed to reflect the correct load result. It may be seen that accuracy in predictions is of critical importance given the cost of incorrect predictions. An alternative of a verification system is to first compute the address of the second load instruction (it would be unnecessary to access the data cache 224 in this operation). The addresses of the first and second load instructions are then compared to make sure that they are the same and that there are no intervening store or snoop instructions between them to the same address.

The detection system may track events in instruction execution to identify unpredicted memory collisions. This may be done by comparing newly-generated addresses for all incoming loads to the addresses of prior load instructions. When a match is found, indicating a memory collision has occurred, the detection system can take note of it. In view of the foregoing, it will be appreciated that some period of "training time" may be required to build up information in the detection system to accurately predict second load instructions that will benefit from the renaming feature of the present invention.

Updates of information for making predictions are performed based on the outcomes of the second load operations. The distance value between first and second load instructions with path information enables the overlapping of multiple dynamic instances of the same static load-load pair, thus increasing the predictor's coverage. This may be a benefit provided by embodiments of the present invention, because overlapping is a frequent behavior, particularly in tight loops.

Figure 3:
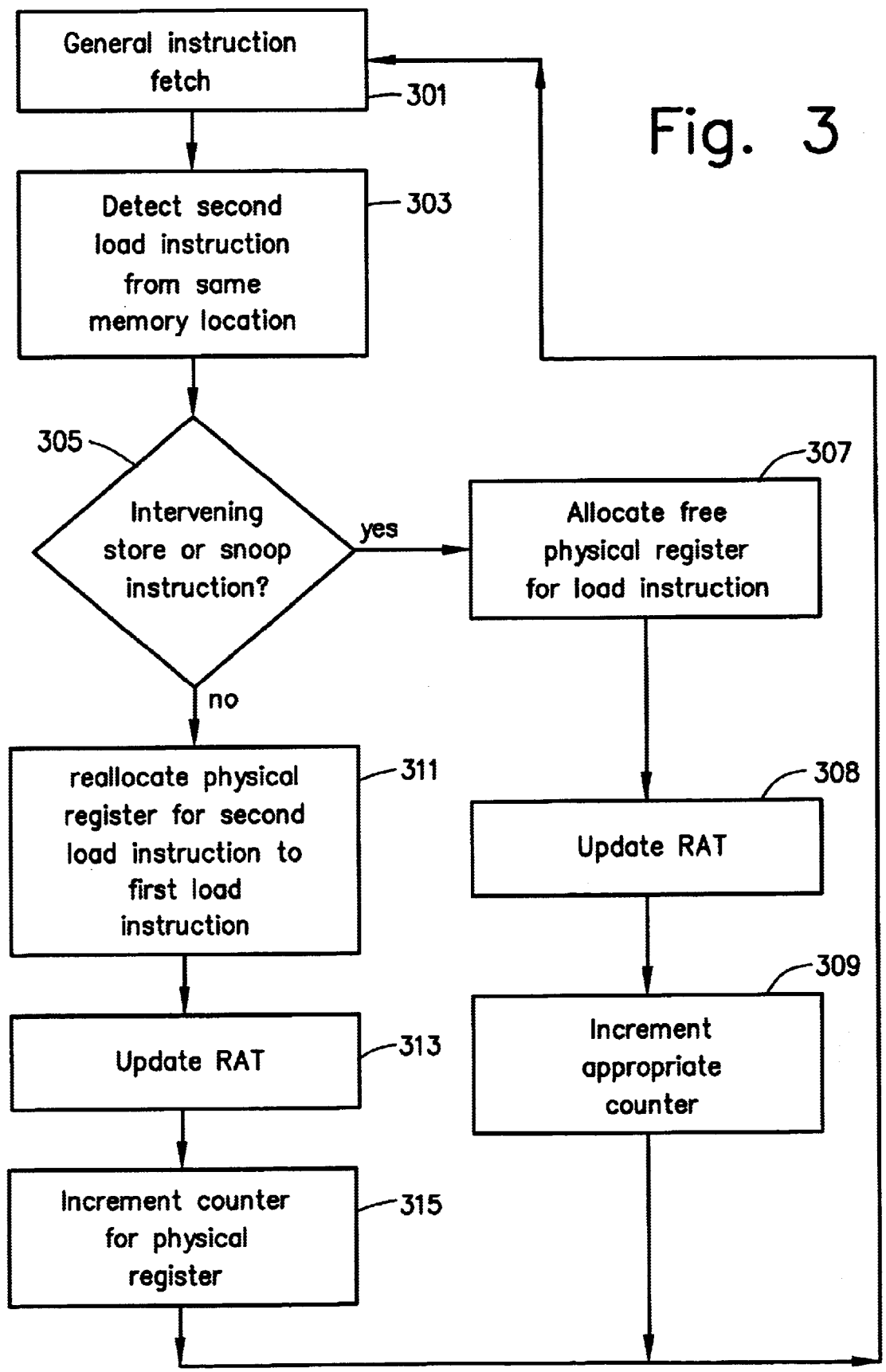
FIG. 3 is a flow diagram of a method according to an embodiment of the present invention.

A flow diagram illustrating the execution of load instructions for some embodiments is depicted in FIG. 3. In block 301 one or more instructions are fetched in a known manner. In block 303, it is detected whether one of the fetched instructions is a second load instruction from the same memory location. As stated previously, this can be a determinative result or a predicted result. In decision block 305, it is determined whether there are any intervening store or snoop instructions between the two load instructions that access the same memory location. If there are, then the second load instruction that has recently been fetched will not benefit from the renaming feature of the present invention. Control passes to block 307 where a free physical register is allocated for this load instruction. In block 308, the RAT is updated and in block 309, the appropriate counter corresponding to, or assigned to, the allocated physical register is incremented (or decremented if by design choice). If there are no intervening store or snoop instructions to the same memory location between the two load instructions then control passes to block 311 where a physical register corresponding to the first load instruction is reallocated to the second load instruction as well. In block 313, the RAT is updated and the appropriate counter for the physical register is incremented (or decremented as the case may be). As stated above, when instructions are retired, the appropriate counter needs to be adjusted so that available physical registers can be identified. Also, in the case of prediction, if the prediction is wrong (i.e., the second load instruction is not loading the same value from the common memory location), then a new physical register must be allocated to the second load instructions and the counters adjusted accordingly.

Although the present invention has been disclosed in detail, it should be understood that various changes, substitutions, and alterations may be made herein. Moreover, although software and hardware are described to control certain functions, such functions can be performed using either software, hardware or a combination of software and hardware, as is well known in the art. Other examples are readily ascertainable by one skilled in the art and may be made without departing from the spirit and scope of the present invention as defined by the following claims.

What is claimed is:

1. A processor, comprising:
 a physical register file comprising a plurality of physical registers;
 a decoder to decode first and second load instructions, each naming a destination logical register; and
 a register allocation table to map each of said destination logical registers to a physical register within said plurality of physical registers, wherein if said first and second load instructions are detected to load from a same memory location into first and second destination logical registers, respectively, then said register allocation table maps said first and second destination logical registers to one of said physical registers.

2. The processor of claim 1 wherein said register allocation table maps said first and second destination logical registers to one of said physical registers when there are no intervening store instructions to said same memory location between said first and second load instructions.

3. The processor of claim 1, further comprising:
 a plurality of counters in one-to-one correspondence with said physical register file to indicate when each of said plurality of physical registers are free.

4. The processor of claim 2, wherein a counter within said plurality of counters associated with said physical register is incremented by a first increment when a new mapping to the physical register is created in said register allocation table.

5. The processor of claim 3, wherein a counter within said plurality of counters associated with said physical register is incremented by a first increment when a load instruction is renamed in which said load instruction names a destination logical register mapped to said physical register.

6. The processor of claim 5, further comprising:
 an active list to record each of said physical registers that are evicted from the register allocation table upon renaming; and a buffer to retire instructions in program order so that one of said counters associated with an evicted physical register is changed by a second increment if the load instruction retires, such that the second increment is opposite in sign to said first increment.

7. The processor of claim 6 further comprising:

a free list to record each of said physical registers that are available for allocation, wherein when changing the counter by said second increment results in a predetermined value, said free list to record said physical register associated with said counter as available.

8. The processor of claim 1, further comprising an execution core containing said load instructions to be executed.

9. A processor, comprising:

a physical register file comprising a plurality of physical registers;

a decoder to decode load instructions, wherein a first load instruction names a destination logical register and a memory location and a second load instruction names a destination logical register and said memory location;

a register allocation table to map a plurality of logical registers to said plurality of physical registers;

a renamer to rename load instructions, wherein a renamed load instruction has a pointer to a physical register to which its destination logical register is mapped;

a forwarding buffer to have entries for renamed load instructions, wherein an entry associated with a renamed load instruction has a field to contain a physical register pointer and a field to contain a load memory location of the renamed load instruction; and wherein if a load instruction having a destination logical register is predicted to collide with a renamed load instruction having a physical register pointer in the forwarding buffer, then the register allocation table maps the destination logical register to a physical register pointed to by the physical register pointer.

10. The processor of claim 9 wherein said register allocation table maps the destination logical register to a physical register pointed to by the physical register if there are no intervening store instruction to said memory location between said first and second load instructions.

11. The processor of claim 9, further comprising a plurality of counters, wherein each counter is associated with each of said plurality of physical registers in the physical register file to indicate if said each physical register is free.

12. The processor of claim 11, further comprising a pointer field to point to said physical register mapped in a mapping evicted by the renamed load instruction.

13. The processor of claim 12, further comprising a buffer to retire the renamed load instruction in program order, wherein the buffer is coupled to the physical register field so that a counter associated with the physical register pointed to by the pointer field is changed if the renamed load instruction is retired.

14. A computer system comprising:

a memory; and a processor, coupled to said memory and including a physical register file comprising a plurality of physical registers;

a decoder to decode first and second load instructions, each naming a destination logical register; and a register allocation table to map each of said destination logical registers to a physical register within said plurality of physical registers, wherein if said first and second load instructions are detected to load from a same location in said memory into first and second destination logical registers, respectively, then said register allocation table maps said first and second destination logical registers to one of said physical registers.

15. The computer system of claim 14 wherein said register allocation table maps said first and second destination logical registers to one of said physical registers when there are no intervening store instructions to said same memory location between said first and second load instructions.

16. The computer system of claim 14, wherein said processor further comprises:

a plurality of counters in one-to-one correspondence with said physical register file to indicate when each of said plurality of physical registers are free.

17. The computer system of claim 16, wherein a counter within said plurality of counters associated with said physical register is incremented by a first increment when a new mapping to the physical register is created in said register allocation table.

18. The computer of claim 16, wherein a counter within said plurality of counters associated with said physical register is incremented by a first increment when a load instruction is decoded in which said load instruction names a source logical register mapped to said physical register.

19. The computer system of claim 18, wherein said processor further comprises a buffer to retire instructions in program order so that one of said counters associated with an evicted physical register is changed by a second increment if the load instruction retires, such that the second increment is opposite in sign to said first increment.

20. The computer system of claim 19 further comprising:

a free list to record each of said physical registers that are available for allocation, wherein when changing the counter by said second increment results in a predetermined value, said free list to record said physical register associated with said counter as available.

21. A method for predicting common load sources among processor load instructions, comprising:

fetching first and second load instructions from memory;

detecting whether the second load instruction is to load from a same memory location as the first load instruction:

detecting whether there are any intervening store instructions to the same memory location; and reallocating a physical register assigned as a destination register for first load instruction as a destination register for said second load instruction.

22. The method of claim 21, further comprising:

storing information relating to a distance between the first load instruction and the second load instruction.

23. The method of claim 22, wherein the distance information corresponds to a distance between the first load instruction and the second load instruction in an instruction window.

24. The method of claim 21, further comprising:

incrementing a counter associated with said physical register after said reallocating operation.

25. The method of claim 24, further comprising:

decrementing a counter associated with said physical register when one of said first and second load instructions is retired.

* * * * *

UNITED STATES PATENT AND TRADEMARK OFFICE
CERTIFICATE OF CORRECTION

PATENT NO.   : 6,772,317 B2
DATED        : August 3, 2004
INVENTOR(S)  : Stephan J. Jourdan et al.

It is certified that error appears in the above-identified patent and that said Letters Patent is hereby corrected as shown below:

<u>Column 10,</u>
Line 15, "each of said...are free" should be -- each of said...is free --.

Signed and Sealed this

Twenty-fifth Day of October, 2005

JON W. DUDAS
*Director of the United States Patent and Trademark Office*